United States Patent [19]

Franssell et al.

[11] Patent Number: 5,015,486

[45] Date of Patent: May 14, 1991

[54] DRY MIX FOR MICROWAVE MUFFINS WITH PSYLLIUM AND METHOD OF PREPARATION

[75] Inventors: Dean E. Franssell, Minneapolis; Philip E. Palkert, Eden Prairie, both of Minn.

[73] Assignee: General Mills, Inc., Minneapolis, Minn.

[21] Appl. No.: 405,783

[22] Filed: Sep. 11, 1989

[51] Int. Cl.$^5$ .................. A21D 6/00; A21D 10/00
[52] U.S. Cl. ................... 426/243; 426/496; 426/554
[58] Field of Search ............... 426/553, 554, 243, 496, 426/549

[56] References Cited

U.S. PATENT DOCUMENTS

| | | | |
|---|---|---|---|
| 3,148,114 | 9/1964 | Fahrenbach et al. | 167/55 |
| 3,161,524 | 12/1964 | Opie et al. | 99/94 |
| 3,222,185 | 12/1965 | Yueh | 426/554 |
| 3,708,306 | 1/1973 | Appleman | 99/2 R |
| 4,321,263 | 3/1982 | Powell | 242/195 |
| 4,348,379 | 9/1982 | Kowalsky | 424/34 |
| 4,459,280 | 7/1984 | Colliopoulos et al. | 424/35 |
| 4,515,824 | 5/1985 | Blake et al. | 426/555 |
| 4,568,557 | 2/1986 | Becker et al. | 426/618 |
| 4,619,831 | 10/1986 | Sharma | 426/93 |
| 4,698,232 | 10/1987 | Sheu et al. | 426/572 |
| 4,759,942 | 7/1988 | Von Fulger | 426/621 |
| 4,766,004 | 8/1988 | Moskowitz | 426/658 |
| 4,777,045 | 10/1988 | Vanderveer et al. | 424/195.1 |
| 4,784,861 | 11/1988 | Gori | 426/74 |
| 4,824,672 | 4/1989 | Day et al. | 424/195.1 |

FOREIGN PATENT DOCUMENTS

| | | |
|---|---|---|
| 1221575 | 5/1987 | Canada . |
| 0068229 | 1/1983 | European Pat. Off. . |
| 0166825 | 9/1988 | European Pat. Off. . |
| 0306469 | 3/1989 | European Pat. Off. . |
| 0309029 | 3/1989 | European Pat. Off. . |
| 8808257 | 11/1988 | Japan . |
| 2201875 | 9/1988 | United Kingdom . |
| 8902225 | 3/1989 | World Int. Prop. O. . |

OTHER PUBLICATIONS

Industrial Gums-Polysaccharides and Their Derivatives, Quince, Psyllium, Flax Seed, and Okra Gums, II. Psyllium Seed Gum, 345-54 (R. Whistler 2d ed. 1973).
R. W. Schery, Plants for Man, 319 (Prentice Hall Inc. 2d ed. 1973).
T. Tanaka, Tanaka's Cyclopedia of Edible Plants of the World, 563-64 (Keigaku Publishing Co. 1976).
The United states Pharmacopeia, 20th ref., The Natioanl Formulary, 15th ed., 915, 929 (United states Pharmacopeial Convention, Inc. 1980).
P. Judd, Comparison of the Effects of High-and Low-Methoxyl Pectics on Blood and Faecal Lipids in Man, 48 British Journal of Nutrition 451-58 (1982).
E. Lund, Cholesteral Binding Capacity of Fiber from Tropical Fruits and Vegetables, 19 LIPIDS 85-90 (1984).
J. Thomas, Alteration of Regression of Cholesterol Accumulation in Rats by Dietary Pectin, 51 British Journal of Nutrition 339-345 (1984).
C. Morris, A Closer Look at Dietary Fiber, Food Engineering, 132-140 (May, 1985).
J. K. C. Chan et al., A Forgotten Natural Dietary Fiber: Psyllium Mucilloid, vol. 33, No. 11 Cereal foods World, 919-922 (1988).
L. Prosky, Determination of Insoluble, Soluble, and Total Dietary Fiber in Foods and Food Products: Interlaboratory Study, 71 J. Assoc. Off. Anal. Chem. 1017-1023 (1988).
Meer Corporation, Technical Information, Psyllium Husks, Undated.

*Primary Examiner*—George Yeung
*Attorney, Agent, or Firm*—John A. O'Toole

[57] ABSTRACT

Disclosed are dry culinary mixes for use in preparing baked goods, especially microwave muffins. The dry mixes employ particular levels of particular high soluble fiber materials. Surprisingly, inclusion of these particular soluble fiber materials in the present microwave dry mixes enables consumers to bake a muffin, using microwave radiant energy, of superior quality in terms of structure, volume, and texture compared to other microwave muffin mixes. The soluble fiber can be provided by minor amounts of the combination of psyllium with guar gum in a weight ratio of 1.5 to 3:1.

21 Claims, No Drawings

DRY MIX FOR MICROWAVE MUFFINS WITH PSYLLIUM AND METHOD OF PREPARATION

TECHNICAL FIELD

This invention relates to food products and particularly to improved dry culinary mixes for microwave muffins. More particularly, the present invention relates to the addition to such mixes of psyllium and guar and/or locust bean gum in small but effective quantities to materially improve important characteristics of the finished microwave baked muffins obtained from such mixes.

BACKGROUND OF THE INVENTION

Muffins are to be distinguished from breads and cakes. Bread doughs, with rare exception, are subjected to intensive mixing and kneading prior to baking; the leavening agent is typically yeast and high gluten flours are preferred. Cake batters are subjected to intensive mixing, preferably by high speed electric mixers to incorporate air and to achieve a smooth texture in the batter prior to baking. Chemical leavening agents are typically employed. Also, cakes are made almost exclusively from soft wheat flours. In making muffins, however, mixing is held to an absolute minimum, a light stirring of from 10 to 20 seconds. Muffins are, of course, usually baked in individual round, straight-sided tins. Chemical leavening agents are used exclusively. According to individual preference muffins may be made from either soft wheat cake flour, hard wheat flour, or all-purpose flour which may be a blend of soft and hard wheat flours. Other materials such as rice flour, wheat bran, whole grain wheat flours, oat bran, and corn meal are popular.

A good muffin should have a texture which is not fine but uniformly robust and slightly coarse with a moist crumb. A good muffin should have a fully developed rounded top evidencing light density. However, the instructions for muffin preparation are deceptively easy, for all too frequently the muffin's texture will be characterized by tough coarseness, great tunnels and cavities throughout the body of the muffin. Frequently, the muffins will be of low volume (high density) despite a theoretically adequate amount of chemical leavening agent.

The use of prepared mixes for baking muffins has received wide usage, particularly in home baking. So-called "dry" prepared mixes for muffins are made by combining flour, shortening, sugar, leavening and other ingredients including perhaps milk solids, egg solids, flavoring and coloring to form a free-flowing mixture. To prepare muffins from these dry mixes for baking, liquid materials such as water, liquid shortening, milk and eggs are added and the combination is then gently stirred to form a wetted mixture without developing the gluten of the flour component. The resulting heterogeneous batter is then baked in individual containers to obtain the finished muffin baked good.

Muffins can vary markedly in many respects, including such physical properties as density, grain size and grain size distribution, cell wall thickness, total moisture, moisture activity, crumb softness, moisture retentivity, specific volume, center point height, etc. Muffins can also differ markedly in such organoleptic properties as texture, mouthfeel, gumminess and off-tastes. Alteration of the dry mix formulation to realize muffins differing in any one attribute generally yield concommitant changes, often detrimental, in several other attributes. Thus, dry mix formulations typically must balance increases in a desired muffin attribute against undesirable changes in others.

Traditionally, consumers preferred dry mixes which produced muffins having numerous rough, uneven, open air cells and which are generally heterogeneous in character. Such muffins typically have high specific volumes (a type of density). Muffins are typically prepared from low sugar to flour ratio dry cake mixes formulated with medium protein concentrations or "all-purpose" flour and with emulsified shortening. The skilled artisan will appreciate that while muffin mixes comprise ingredients roughly comparable to other baked goods, e.g., brownies, layer cakes, etc., that dry mixes must be carefully formulated to achieve muffin-like attributes in contrast to the attributes which characterize other baked good types.

The formulation of culinary mixes for baked goods such as muffins for the at-home preparation by conventional oven baking is highly developed. However, present consumer trends for even greater convenience have given rise to desires for culinary mixes for muffins to be prepared by microwave baking.

Batters from consumer culinary mixes designed for oven baking can be microwave baked. However, the quality of finished baked goods from microwave baking, e.g., microwave layer cakes, can suffer from numerous qualitative deficiencies. For example, when a conventional oven baking dry mix is prepared into a batter and microwave baked, the finished muffin texture can be fine-textured and spongy. Often, specific gravities are much higher. Also, pronounced variations from edge to center are observed. The center can be tough and dry while the edges are overly wet or soggy. Rather than a desirable slight peaking in the center (center to edge ratio of at least 1.50), even center point depressions can occur ($<1.00$).

Many deficiencies in finished muffin quality prepared by microwave baking of batters from dry mixes formulated for oven baking are caused or aggravated by a fundamental difference in the baking mechanism between oven and microwave baking. In microwave baking, the pan and the solid ingredients, generally, are relatively microwave inert and are not heated while the liquids, especially the moisture and fat, are heated. In direct contrast, in oven baking, the pan and solid structure are heated relatively quickly while the moisture is heated more slowly. Also, microwave energy has a dramatically different speed of heating. Furthermore, the microwave energy itself interacts with batter ingredients to cause deleterious textural changes in the finished product. As a result, while both oven baking dry mixes and microwave baking mixes will both include flour, sugar, shortening and flavorings, the highly developed formulation technology of oven baking dry mixes provides very little guidance for formulating microwave culinary dry mixes. For example, U.S. Pat. No. 3,161,524 discloses a dry mix for layer cakes prepared by conventional oven baking which dry mix comprises minor amounts of guar and/or locust bean gum. The compositions therein described as highly useful for the oven baking preparation of baked goods, especially layer cakes, has been found to not be useful for the microwave baking preparation of muffins.

The prior art does include compositions and methods for microwave culinary dry mixes which are taught to be useful for microwave baking (see for example, U.S. Pat. No. 4,419,377 entitled Cake Mix Containing a Lipophilic Emulsifier System, issued Dec. 6, 1987 to Seward et al.). Furthermore, consumer dry goods products have recently become commercially available, (see for example, Microwave Chocolate Cake Mix brand layer cake dry mix available from The Pillsbury Co.). Even better dry mixes for microwave baking of layer cakes are available under the Betty Crocker MicroRave brands (see also U.S. Ser. No. 192,579 entitled Dry Mix For Microwave Layer Cake, filed May 11, 1988 by Jackson et al.). While useful, there is a continuing need for new and improved microwave dry mixes useful in the preparation of microwave baked goods. Surprisingly, multiple end product quality attributes of muffins are dramatically improved by formulating dry mixes comprising gum systems which include the present, defined gum mixture combination.

The present invention provides improved dry mix compositions, methods for the preparation of microwave baked goods and superior finished muffin baked goods. Unexpectedly, multiple end product quality attributes are dramatically improved by formulating dry mixes comprising particular levels of psyllium in combination with particular levels of guar gum. The present dry mixes provide the advantages of increased tolerance to variations in the microwave power capacities of the various microwave ovens as well as tolerance to variations in liquids addition. The resultant finished muffins of the present invention exhibit better specific volume and dome shape than can occur due to variations in microwave power and/or liquids addition.

An additional benefit is that the present finished baked goods provide high levels of soluble fiber. A good description of the literature pertaining to the health discussion on the role of fiber is found in U.S. Pat. No. 4,777,045 (issued Oct. 11, 1988 to Vanderveer et al. and entitled High Bran Snack) which is incorporated herein by reference. While in the past, interest in fiber was primarily directed towards insoluble fiber, e.g., bran, there is currently a growing awareness of the health benefits to people associated with soluble fiber consumption, especially reductions in blood serum cholesterol, i.e., antihypercholesterolemic benefits.

SUMMARY OF THE INVENTION

In its product aspect, the present invention relates to improved microwave dry culinary mixes which provide improved finished microwave muffins. In its article aspects, the present invention resides in improved batters and in baked goods prepared therefrom, i.e, finished muffins, which exhibit enhanced volume and center height to edge ratios as well as superior general muffin quality which have been microwave baked compared to conventional culinary mix muffins which have been microwave baked. The muffins also have high levels of soluble fiber.

The present dry mixes comprise from about 20% to 50% by weight of the dry mix of wheat flour, from about 30% to 55% by weight of sugar. The sugar to flour ratio in the dry mix ranges from about 1.10 to 1.35. The present dry muffin mixes additionally essentially comprise from about 5% to 20% by weight of an emulsified shortening and from about 0.1% to 4% of a chemical leavening agent. The present microwave dry culinary mixes also essentially comprise from about 1% to 5% by weight of psyllium and about 0.25% to 2.5% guar gum.

In one method aspect, the present invention embraces methods for improving batters for muffins and to microwave methods for baking muffins. The present methods for improving batters for muffins comprise the steps of adding to a dry batter mix from about 1% to 5% by weight (solids basis) of psyllium and 0.25% to 2.5% guar gum. The present invention further includes microwave methods for preparing muffins which methods employ the present dry mixes. The present invention further comprises methods for lowering serum cholesterol levels by consuming the present muffin baked goods.

DETAILED DESCRIPTION OF THE INVENTION

The improved dry mixes for microwave muffins of the Present invention produce finished microwave muffins which exhibit enhanced volume and center point height or doming as well as superior texture and grain structure. The dry mixes essentially comprise flour, sugar, emulsified shortening, chemical leavening agents, color/flavoring materials and the combination of psyllium and guar and/or locust bean gum. Each of these ingredients as well as optional components and dry mix composition preparation and use and the present microwave baking methods are discussed in detail below.

Throughout the specification and claims, percentages and ratios are by weight and temperatures are in degrees Fahrenheit, unless otherwise indicated.

A. Flour

The present dry mix compositions essentially contain from about 30% to 60% of the dry mix of flour. Better results are achieved when the flour level ranges from about 45% to 55% by weight of the dry mix. The flour(s) useful in the dry mixes of the present invention can be of conventional type and quality. Wheat flours are preferred but other flours conventionally used in the preparation of muffins can also be employed in full or partial substitution for the wheat flour. Traditional cake flour used for layer cakes has about 8% or less protein by weight of the flour. Pastry flour ordinarily has a protein level of about 10%. Other flours such as bread flour generally have higher protein levels of about 11% to 13% by weight. The preferred protein range for the wheat flour useful in this invention is between about 9% to 10% by weight of the flour. This protein range permits easy removal of the muffins from the pan. A good general all-purpose flour also can be used. Such all-purpose flour generally comprises a mixture of both hard and soft wheat flours, i.e., both high protein level and low protein level flours. Such flours are useful if the average protein content ranges from about 8% to 10% by weight.

B. Sugar

The dry mix compositions of the present invention also essentially comprise from about 25% to 45% sugar(s). Typically, sucrose is used in muffin mixes as the sugar ingredient although up to about 15% of the sugar in the present dry mix can be supplied by dextrose or by other nutritive carbohydrate sweetening agents, e.g., corn syrup solids. Commercially available sugar usually contains up to about 4% starch as an aid to maintaining its free-flowing properties. Preferably, the sugar is included in the mix in amounts of from about 10% to 30% by weight of the mix.

The baker's ratio is the weight ratio of sugar to flour. Low ratio muffins, i.e., an excess of flour, have long been preferred for texture and keep other eating qualities. The present muffin mixes essentially have a weight ratio of flour to sugar of about 1:0.2 to 0.7. Better results are achieved when the flour to sugar ratio in the present mixes ranges from about 1:0.4 to 0.55.

In a preferred embodiment, a substantial portion of the sugar ingredient is finely ground. Finely ground sugars aid the pourability of the present dry mixes, particularly when plastic shortening is used at high levels. Better results are achieved when at least 50% by weight of the sugar component has an average Particle size of 50 microns or below. The remainder of the sugar component can be supplied by conventional granulated sugar.

C. Shortening Component

The instant dry mix compositions also essentially comprise from about 5% to 20% of an emulsified shortening ingredient. Preferably, the present dry mix compositions comprise from about 10% to about 15% of the shortening ingredient. Best results are obtained when the shortening component comprises about 11% of the present dry mix compositions. Maintenance of shortening concentrations within these limits is important for the realization of dry mixes in the form of free-flowing particles. Such concentrations are also important in providing muffins of acceptable textural quality.

Conventional shortening materials are suitable for use as the shortening ingredient of the present dry mixes. Such conventional shortening materials are well known in the culinary mix preparation art. The conventional shortenings useful herein are fatty glyceridic materials which can be classified on the basis of their physical state at room temperature. Liquid shortenings can be used in the present dry mix compositions and provide the advantage of ease of incorporation into dry mixes. Solid shortening can also be used and provides the advantage of desirable mouthfeel upon cake consumption. More commonly, and preferred for use herein, mixtures of liquid and solid shortenings are used in dry mixes. Such mixes can be fluid or plastic depending in part upon the level of solid fatty materials. Shortenings of this type comprise a liquid oil containing from about 2% to 26% normally solid fatty glycerides. That is, a solids content index ("SCI") at 70° and 4% to 6% at 100° F.

The solid fatty glycerides can include fatty monoglycerides and diglycerides of saturated fatty acids having 16 to 22 carbon atoms. The liquid shortening can be animal, vegetable or synthetic oil (e.g., sucrose polyesters) which is liquid at ordinary room temperatures. Representative of such liquid shortenings are coconut oil, palm kernel oil, cottonseed oil, peanut oil, olive oil, sunflower seed oil, sesame seed oil, corn oil, safflower oil, poppy seed oil, soybean oil, rapeseed oil, babassue oil and the like. Other suitable shortening materials and methods of shortening preparation as described in detail in Bailey, "Industrial Oil and Fat Products," (3rd ed. 1964) which is incorporated herein by reference.

Conventionally, the shortening ingredient of muffin mixes is emulsified. That is, the shortenings provide a convenient carrier for addition of emulsifiers to the dry mix. Such emulsifiers aid the realization of muffins with improved grain structure and texture. The emulsifier typically comprises from about 1% to 20% of the shortening component, preferably from about 5% to about 15% and, most preferably from about 10% to 15%.

The exact amount of emulsifier used is determined by the particular emulsifier employed and specific desired finished muffin attributes. The art is replete with emulsifiers which are suitable for inclusion in the shortening component for the provision of dry mixes for muffins. Thus, selection of particular emulsifiers will pose no problems for the skilled artisan.

Generally useful as the emulsifier component of the shortening ingredient are partially esterified polyhydric compounds having surface active properties. This class of emulsifiers includes among others, mono- and diglycerides of fatty acids, such as monopalmitin, monostearin, monoolein, and dipalmitin; partial fatty esters of glycols, such as propylene glycol monostearate and monobehenate; higher fatty acid esters of sugars, such as the partial palmitic and oleic acid esters of sucrose; and phosphoric and sulfuric acid esters, such as dodecyl glyceryl ether sulfate and monostearin phosphate. Other examples include the partial esters of hydroxy carboxylic acids, such as lactic, citric, and tartaric acids with polyhydric compounds, for example, glyceryl lactopalmitate, and the polyoxyethylene ethers of fatty esters of polyhydric alcohols, such as a polyoxyethylene ether of sorbitan monostearate or distearate. Fatty acids alone or esterified with a hydroxy carboxylic acid, e.g., stearyl-2-lactylate, are also useful.

D. Chemical Leavening Agent

Another essential ingredient of the present dry mixes is a chemical leavening agent. The chemical leavening comprises from about 0.1% to 4% of the present dry mixes, preferably from about 1% to 3% of the dry mixes.

In the broadest aspects, any general chemical leavening or system can be employed in the formulation of culinary dry mixes for muffins. In general, such systems are composed of a baking soda, e.g., sodium, potassium, or ammonium bicarbonate, etc., as a source of carbon dioxide on one hand, and one or more other common baking acids on the other. In conventional culinary mixes formulated for oven baking of muffin mixes the preferred chemical leavening system includes any baking soda and a mixture of baking acids. The baking acid mixture typically comprises a first, slow-reacting baking acid and a second, fast-reacting baking acid. In contrast, in the present preferred embodiments the leavening acid preferably comprises only fast acting acids. In the most preferred embodiments, the leavening acid works at room temperatures. Exemplary useful acids are selected from the group consisting of citric acid, lactic acid, acetic acid, propionic acid, cream of tartar, monocalcium phosphate monohydrate, fast acting sodium acid pyrophosphate and mixtures thereof. The preferred acid is monocalcium phosphate monohydrate. The weight ratio of the baking acid to the baking soda is about 0.75:1 to 1.25:1, preferably about 1:1.

E. Gum System

A selected mixture of gums or gum system is an essential component of the present dry mixes. The gum system comprises psyllium and guar and/or locust bean gum. While not wishing to be bound by the proposed theory, it is speculated herein that the present gum mixture comprising psyllium is very quickly hydrated leading to rapid development of batter viscosity upon admixture of liquids to the dry mix. Both guar and locust bean gums are particularly effective at binding water. For reasons unknown, these combinations of gum attributes enable the realization of both good specific volumes in the baked muffins as well as good shape upon microwave baking.

Surprisingly, superior results in terms of a balance of desirable attributes are obtained when the gum combination is employed compared with when equivalent levels of psyllium, guar or locust bean alone are employed.

Psyllium seed gum is well known and has a long history of use by humans and is a staple of commerce. The sourcing and use of psyllium is well described in various sources including Industrial Gums: Polysaccharides and Their Uses, second edition, edited by Whistler et al., Academic Press, N.Y. 1973, more briefly in the United States Pharmacopeia, 12th edition: The National Formulary, 15th edition, The United States Pharmacopeia Convention Inc., July 1, 1980, pages 915-929, Plants for Man, second edition, by R. W. Schery, Prentice Hall Inc., 1973, page 319. See also, U.S. Pat. No. 4,321,263 (issued Mar. 23, 1982 to Powell), U.S. Pat. No. 4,459,280 (issued July 10, 1984 to Colliopoulos et al.), and U.S. Pat. No. 4,766,004 (issued Aug. 3, 1988 to Moskowitz), each of which is incorporated herein by reference.

Generally, psyllium husks are the clean, dried seed coat material which is separated by winnowing and thrashing from the seeds of *Plantago ovata*, known in commerce as blanc psyllium, *Indian psyllium* or *ispaghula*. French (black) psyllium comes from *Plantago indica* and occasionally from Spain as well. Both psyllium seed and psyllium husk are classified as bulk forming laxatives. As used in the present invention, the noun "psyllium" is meant to refer to psyllium husks and not to psyllium seed or to psyllium seed gum. Psyllium seed gum is not intended to be embraced herein by the term "psyllium."

Psyllium, or synonomously psyllium husks, as noted briefly above, is prepared by abraiding psyllium seed to separate the psyllium husk or mucilage from the seed core. Psyllium husk is available in various commercial grades. First cut or highest grade psyllium is preferred due to its higher concentration of water soluble fiber. However, first cut psyllium or high grade psyllium is more expensive. Second cut, or blends of first cut with second cut, are less desirable due to their lower soluble fiber content but, generally, are nonetheless more preferred for use herein due to their lower cost/value relationship.

The present dry mix compositions essentially comprise about 2% to 8% psyllium. Better results in terms of specific volumes and nicely domed muffins without undesirable dryness are obtained when the psyllium comprises about 2% to 5% of the dry mix. For best results, the psyllium can comprise about 2.5% to 3.5% of the dry mix.

In the practice of the present invention, good results are obtained when first pass psyllium (a purity level of about 95%) is employed. Generally, higher amounts of second pass, lower soluble fiber content psyllium are needed than when first pass psyllium with a higher soluble fiber content is employed compared with second pass psyllium (about 85% purity).

The present novel gum system additionally comprises about 0.25% to 3.5% of the dry mix of a second gum selected from the group consisting of guar gum, locust bean gum and mixtures thereof. Better results are obtained when the second gum is present at about 0.5% to 2% of the dry mix. For best results, the dry mixes comprise about 1% to 1.75% of the second gum and the psyllium to second gum ranges from about 1.5 to 3:1. Guar and locust bean gums are well known and each is a commonly utilized food ingredient. The skilled artisan will have no difficulty selecting commercial sources and grades of guar or locust bean gum which can be used herein.

F. Optional Components

The present dry mixes can optionally contain a variety of additional ingredients suitable for rendering finished muffins prepared therefrom more organoleptically desirable. Such optional dry mix components include flavor/coloring agents, especially cocoa, egg white solids, salt, coloring agents, flavoring agents, nuts and fruit. If present, such optional components comprise from about 1% to 8% of the dry mixes of the present invention.

Another highly preferred optional ingredient in the present dry mix compositions is nonfat dry milk solids. Nonfat dry milk solids aid the structuring of the finished baked good. If present, such dry milk solids can comprise from about 0.5% to 2.0% of the present mixes.

Still another useful optional ingredient is oat bran. Recent consumer interest in oat bran is high due to the interest in soluble fiber since oat bran is considered to be a good source of soluble fiber. If present, the oat bran can comprise about 1% to 40%, preferably about 25% to 35% by weight of the dry mix. The oat bran is used in partial substitution for the flour component. The oat bran itself typically has a soluble fiber content of about 6% by weight.

DRY MIX COMPOSITION PREPARATION

The dry mixes of the present invention are prepared by blending the essential and optional components together in such a conventional manner as to produce a free-flowing dry mix. In a preferred method of dry mix preparation, the flour, the sucrose, the shortening, the leavening agent and any optional ingredients are blended in a ribbon blender for a period of about 8 to 20 minutes at a mix temperature below about 65° F. When a liquid oil is part of the shortening ingredient, then the oil is normally added during blending by means of an oil spray or by extruding the blend mixture through a spreader bar. Blending is continued after introduction of the oil until the oil lump count is from about 10% to 15% by weight on a number 10 U.S. Standard sieve. Best results are obtained when the temperature of the mix after blending is from about 65° to 70° F.

In the preferred method of dry mix preparation the mix is subsequently finished in a standard commercial finisher. Finishers are devices for reducing shortening lump size and for more intimately incorporating the shortening into a mix by impact mixing. Thus, finishing the mix in a finisher is highly preferred when the shortening component comprises a plastic shortening. Commercially available finishers generally include an exposure on which are mounted rapidly rotating blades. After finishing to insure reduction in lump count, larger sized optional ingredients such as nuts and fruits are then blended into the mix. The present dry mixes are then packaged in a conventional manner in conventionally suitable containers which typically hold specific weights of the dry mix.

DRY MIX COMPOSITION USE

The present dry mixes are conveniently prepared into finished muffins by forming a gently admixed, heterogeneous batter by hand mixing the dry mix no more than twenty strokes, after having added water or other aqueous liquid, oil and eggs or egg whites to the mix to form an improved batter having about 20% to 40% moisture, 0 to 30% oil in addition to the shortening component, and 0 to 5% egg solids. Only simple mixing (i.e., with a fork or spoon) after liquids addition for about five to ten strokes is required to form a batter.

Thereafter, a suitable quantity of the batter resulting from the mixing process is spooned into a muffin paper holder and/or to the pockets of a muffin pan, (i.e., microwave transparent) and microwave baked for sufficient times, for example, for 1 to 2 minutes a piece at full power, to form a finished microwave muffin. Better results are observed when individual muffins are microwave baked or when smaller sized muffin pans such as those ranging from about 3 to 7 batter pockets are employed.

The resultant finished microwave muffins are characterized by specific good volume. Specific volume is the volume of finished baked good per unit weight of dry mix, (e.g., cc/g) and is typically measured by a standard rapeseed displacement method. The muffins are also characterized by good crumb texture and good center to edge ratios, e.g., ranging from about 1:1.3 to 1.7, preferably 1:1.5 to 1.7. The muffins are further beneficially characterized by high levels of soluble fiber ranging from about 2.5% to 7% or even higher when oat bran is used as an ingredient. (Oat bran generally is 5% to 9% soluble fiber.)

Of course, the present batters can also be conventionally oven baked to prepare finished baked goods. However, the texture, volume, crumb texture will not be optimal. The oven baked, finished baked goods will nonetheless possess high levels of soluble fiber and will provide then the associated health benefits.

In addition to the texture and volume benefits provided to microwave baked muffins, the present dry mixes provide additional important health benefits as well. In particular, muffins prepared from the present dry mixes upon consumption can provide alleviation of certain gastrointestinal disorders, for example, constipation or diarrhea. Additionally, consumption of the present muffins can have antihypercholesterolemia affects, i.e., can help lower blood cholesterol levels. Accordingly, the present invention further resides in treatment methods comprising as the operative step, consumption or ingestion of the present muffins. A treatment regimen of the present invention comprises oral administration to a patient in need of treatment to alleviate gastrointestinal disorders, such as irritable bowel syndrome, constipation or diarrhea, or susceptible to or affected with hypercholesterolemia of a safe and effective amount of a muffin containing psyllium seed gum and guar and/or locust bean gum, or source thereof made according to the process of the present invention. By "safe and effective amount" is meant an amount sufficient to alleviate the gastrointestinal disorders but not so much as to cause any undesirable side effects (e.g., excess laxation). Ingestion of a total of from about 5 g to about 15 g of psyllium and about 1 g to 5 g of guar and/or locust bean material per day per 70 kg individual, (i.e., about 50 to 300 mg/kg respectively, of body weight) and 6 to 60 mg/kg, respectively, is appropriate in most circumstances to relieve these conditions. This can be accomplished by daily ingestion of from about one to about four, preferably about two muffins each weighing about 60 g, each containing from about 3 g to about 6 g of the gum material. Preferably said, ingestion is at regularly spaced intervals throughout the day. This can vary somewhat with the size and condition of the patient. Such matters will, of course, be apparent to the attending physician. However, since the psyllium and guar/locust bean material is nontoxic and nonallergenic, even higher ingestion levels can be used without undue side effects, keeping in mind that excess psyllium can have a laxative effect.

If the patient suffers from chronic gastrointestinal disorders, including irritable bowel syndrome, constipation or diarrhea, chronic ingestion of from about one to about four muffins per day may be appropriate.

A second method of treatment aspect of the present invention comprises orally administering to a patient having hypercholesterolemia a safe and effective amount of a muffin (made as described herein) comprising psyllium seed gum, or source thereof, and guar and/or locust bean gum. By "safe and effective amount" is meant an amount sufficient to reduce blood cholesterol to normal levels but not so much as to cause any undesirable side effects (e.g., excess laxation). Ingestion of a daily total of from about 5 g to about 15 g of psyllium, and ingestion of a daily total of from about 1 g to about 5 g of the guar and/or locust bean gum is appropriate (e.g., for a 70 kg individual) in most circumstances. This can be accomplished by daily ingestion of from about one to about four, preferably about two muffins, each containing from about 2 g to about 5 g of psyllium material and from about 0.25 g to about 1.75 g of the guar and/or locust bean gum at two or three regularly spaced intervals throughout the day. This treatment regimen is continued until the condition is relieved. This can vary somewhat with the size and condition of the patient, and the patient's blood cholesterol level. Such matters will, of course, be apparent to the attending physician. However, since the psyllium material and the guar and locust bean gum are nontoxic and nonallergenic, even higher ingestion levels can be used without undue side effects, keeping in mind that the materials herein do have a laxative effect.

In a preferred embodiment, to enhance ease of usage in a treatment regimen, the muffins are formulated such that they each contain a pharmaceutical unit dosage amount of the psyllium and guar/locust bean components.

Without further elaboration, it is believed that one skilled in the art can, using the preceding description, utilize the present invention to its fullest extent. The following preferred specific embodiments are, therefor, to be construed as merely illustrative and not limitative of the remainder of the disclosure. It will be appreciated that other modifications of the present invention, within the skill of those in the food art, can be undertaken without departing from the spirit and scope of the invention.

Example 1

A control dry mix for a microwave muffin is prepared from the following formulation:

| Ingredient | Weight % |
| --- | --- |
| Flour | 51.8 |

-continued

| Ingredient | Weight % |
| --- | --- |
| Sugar | 24.1 |
| Shortening | 11.3 |
| Dextrose | 4.3 |
| Banana flakes | 3.1 |
| Pregelatinized starch | 1.3 |
| Toasted wheat germ | 1.0 |
| Salt | 1.0 |
| Sodium aluminum phosphate | 0.9 |
| Sodium bicarbonate | 0.8 |
| Banana flavor | 0.2 |
| Caramel color | 0.1 |
| | 100.0% |

About 185 g of the above formulation is admixed with 90 g milk (2% butterfat), and 50 g fresh eggs, with a fork until a rough batter is formed. Thereafter, about 60 g of the batter is placed in a paper muffin holder and is microwave heated from 1 to 2 minutes to form a microwave muffin. The height of the muffin was about 4.8 cm and the height to edge ratio about 1:1.4. Thus, the control muffin was characterized both by poor height (i.e., less than 5 cm) and poor height to edge ratio, i.e., under 1.5.

Example 2

A dry mix for a microwave muffin mix of the present invention was prepared having the following formulation:

| Ingredient | Amount |
| --- | --- |
| Control mix | 178.50 g |
| Psyllium (1.76%) | 3.25 g |
| Guar (1.76%) | 3.25 g |
| | 185.00 g |

A batter was prepared by admixing 90 g milk (2% butterfat) and 50 g eggs with 185 g of the dry mix. About 60 g of the batter were placed in each of four paper muffin cups. The four filled muffin cups were placed on a turntable in a microwave oven (700 watts) and heated for about 180 sec. to form microwave baked muffins. The muffins so prepared were characterized by an average height of about 5.1 cm and a height to edge ratio of 1.5.

Example 3

A dry mix for a microwave muffin of the present invention was prepared having the following formulation:

| Ingredient | Amount |
| --- | --- |
| Control mix | 175.25 g |
| Psyllium | 6.50 g |
| Guar gum | 3.25 g |
| | 185.00 g |

A batter was prepared as in Example 2 with 50 g eggs and 90 g milk added to microwave muffin cups and microwave heated to form microwave baked muffins. The muffins so prepared were characterized by an average height of about 5.1 cm and a height to edge ratio of about 1.5.

Example 4

A dry mix for a microwave muffin of the present invention was prepared having the following formulation:

| Ingredient | Amount |
| --- | --- |
| Control mix | 175.25 g |
| Psyllium | 6.50 g |
| Guar gum | 3.25 g |
| | 185.00 g |

A batter was prepared as in Example 2 with 50 g eggs and 90 g milk added to microwave muffin cups and microwave heated to form microwave baked muffins. The muffins so prepared were characterized by an average height of about 5.1 cm and a height to edge ratio of about 1.5.

Substantially similar results are obtained if the guar gum of this example is replaced, in whole or in part, with locust bean gum.

Example 5

A dry mix for a microwave muffin of the present invention was prepared having the following formulation:

| Ingredient | Amount |
| --- | --- |
| Control mix | 175.25 g |
| Psyllium | 6.50 g |
| Guar gum | 3.25 g |
| | 185.00 g |

A batter was prepared as in Example 2 with 50 g eggs and 90 g milk added to microwave muffin cups and microwave heated to form microwave baked muffins. The muffins so prepared were characterized by an average height of about 5.1 cm and a height to edge ratio of about 1.5.

Example 6

A dry mix for a microwave muffin of the present invention was prepared having the following formulation:

| Ingredient | Amount |
| --- | --- |
| Control mix | 175.25 g |
| Psyllium | 6.50 g |
| Guar gum | 3.25 g |
| | 185.00 g |

A batter was prepared as in Example 2 with 50 g eggs and 90 g milk added to microwave muffin cups and microwave heated to form microwave baked muffins. The muffins so prepared were characterized by an average height of about 5.1 cm and a height to edge ratio of about 1.5.

Example 7

A dry mix for a microwave muffin of the present invention was prepared having the following formulation:

| Ingredient | Amount |
| --- | --- |
| Control mix | 175.25 g |
| Psyllium | 6.50 g |
| Guar gum | 3.25 g |
| | 185.00 g |

A batter was prepared as in Example 2 with 50 g eggs and 90 g milk added to microwave muffin cups and microwave heated to form microwave baked muffins. The muffins so prepared were characterized by an average height of about 5.1 cm and a height to edge ratio of about 1.5.

Example 8

A base dry mix for microwave oat muffin mix is prepared having the following formulation:

| Ingredient | Weight % |
| --- | --- |
| Oat bran | 34.0 |
| Flour | 22.7 |
| Brown sugar, powdered | 20.0 |
| Soybean oil | 8.0 |
| Dextrose | 6.0 |
| Shortening | 4.0 |
| Pregelatinized starch | 1.5 |
| Phosphate blend | 1.1 |
| Dried molasses | 1.0 |
| Sodium bicarbonate | 0.9 |
| Salt | 0.8 |
| | 100.0% |

A dry mix for a microwave muffin mix of the present invention was prepared having the following formulation:

| Ingredient | Amount |
| --- | --- |
| Oat bran base mix | 191.50 g |
| Psyllium | 5.25 g |
| Locust bean gum | 3.50 g |
| | 200.25 g |

The microwave muffin mix so prepared is useful for the microwave cooking preparation of an oat bran muffin.

What is claimed is:

1. A culinary dry mix useful in the preparation of muffin batter which upon microwave baking yields a baked good of improved volume and texture yet comprising high levels of soluble fiber, comprising:
   A. about 20% to 50% by weight of the dry mix of flour;
   B. about 25% to 45% by weight (dry basis) of the dry mix of sugars;
   C. about 5% to 20% by weight of the dry mix of shortening, said shortening comprising
      1) about 90% to 99% fatty triglycerides, and
      2) about 1% to 10% of an emulsifier;
   D. about 2% to 8% by weight of the dry mix of psyllium;
   E. about 0.25% to 3.5% by weight of the dry mix of a member selected from the group consisting of guar gum, locust bean gum and mixtures thereof;
   F. about 0.1% to 4% by weight of the dry mix of a leavening system.
2. The culinary mix of claim 1 comprising greater than 1% to about 2.5% by weight of a member selected from the group consisting of guar gum, locust bean gum and mixtures thereof.
3. The culinary mix of claim 2 comprising about 2% to 5% by weight of first pass psyllium.
4. The culinary mix of claim 3 wherein the gum member is guar gum.
5. The culinary mix of claim 4 comprising about 2.5% to 3.5% psyllium.
6. The culinary mix of claim 5 additionally comprising about 1% to about 40% by weight of oat bran.
7. The culinary mix of claim 6 additionally comprising 0.5% to 2% by weight of nonfat dry milk solids.
8. A process for improving a microwave batter consisting essentially of flour, sugar, shortening, leavening and sufficient liquids to form a batter which comprises incorporating into the batter about 1% to 8% by weight (dry basis) of psyllium and about 0.25% to 2.5% by weight (dry basis) of a member selected from the group consisting of guar gum, locust bean gum and mixtures thereof.
9. The method of claim 8 wherein the microwave batter comprises greater than 1% to about 2.5% by weight of a member selected from the group consisting of guar gum, locust bean gum and mixtures thereof.
10. The method of claim 9 wherein the microwave batter comprises about 2% to 4% by weight of first pass psyllium.
11. The method of claim 10 wherein the gum member is guar gum.
12. The method of claim 11 wherein the microwave batter comprises about 2.5% to 3.5% psyllium.
13. The method of claim 12 wherein the microwave batter additionally comprises about 1% to 40% by weight of oat bran.
14. The method of claim 13 wherein the microwave batter additionally comprises 0.5% to 2% by weight of nonfat dry milk solids.
15. A microwave baking method for preparing a microwave muffin with superior volume and texture, comprising the steps in sequence of:
   A. admixing a dry mix and sufficient amounts of liquids to form a batter, said dry mix comprising
      1. about 20% to 50% by weight of the dry mix of flour;
      2. about 25% to 45% by weight (dry basis) of the dry mix of sugar;
      3. about 5% to 20% by weight of the dry mix of shortening, said shortening comprising
         a. about 90% to 99% fatty triglycerides, and
         b. about 1% to 16% of an emulsifier;
      4. about 1% to 8% by weight of the dry mix of psyllium;
      5. about 0.25% to 3.5% by weight of the dry mix of a member selected from the group consisting of guar gum, locust bean gum and mixtures thereof;
      6. about 0.1% to 4% by weight of the dry mix of a leavening system consisting essentially of
         a. a baking soda,
         b. a solid, fast acting leavening acid selected from the group consisting of citric acid, lactic acid, acetic acid, propionic acid, cream of tartar, monocalcium phosphate monohydrate, fast acting sodium acid pyrophosphate and mixtures thereof and wherein the weight ratio of baking soda to acid ranges from about 1:0.75 to 1.25, and B. microwave baking the batter in a microwave compatible container for a time sufficient to form a finished baked good.

16. The method of claim 15 wherein the batter comprises greater than 1% to about 2.5% by weight of a member selected from the group consisting of guar gum, locust bean gum and mixtures thereof.

17. The method of claim 16 wherein the batter comprises about 2% to 4% by weight of first pass psyllium.

18. The method of claim 17 wherein the gum member is guar gum.

19. The method of claim 18 wherein the batter comprises about 2.5% to 3.5% psyllium.

20. The method of claim 19 wherein the batter additionally comprises about 1% to 40% by weight of oat bran.

21. The method of claim 20 wherein the batter additionally comprises 0.5% to 2% by weight of nonfat dry milk solids.

* * * * *